United States Patent
Mita et al.

(10) Patent No.: US 10,247,979 B2
(45) Date of Patent: Apr. 2, 2019

(54) POLARIZING FILM, PRESSURE-SENSITIVE-ADHESIVE-LAYER-ATTACHED POLARIZING FILM, AND IMAGE DISPLAY DEVICE

(71) Applicant: NITTO DENKO CORPORATION, Ibaraki-shi, Osaka (JP)

(72) Inventors: Satoshi Mita, Osaka (JP); Tomonori Ueno, Osaka (JP); Yusuke Motegi, Osaka (JP); Jingfan Xu, Osaka (JP); Atsushi Kishi, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/515,890

(22) PCT Filed: Sep. 29, 2015

(86) PCT No.: PCT/JP2015/077580
§ 371 (c)(1),
(2) Date: Mar. 30, 2017

(87) PCT Pub. No.: WO2016/052540
PCT Pub. Date: Apr. 7, 2016

(65) Prior Publication Data
US 2017/0299920 A1    Oct. 19, 2017

(30) Foreign Application Priority Data

Sep. 30, 2014 (JP) .................. 2014-202623
Sep. 30, 2014 (JP) .................. 2014-202624
(Continued)

(51) Int. Cl.
*G02F 1/1335*    (2006.01)
*C08K 5/00*    (2006.01)
(Continued)

(52) U.S. Cl.
CPC ...... *G02F 1/133528* (2013.01); *C08K 5/0025* (2013.01); *C09J 129/04* (2013.01);
(Continued)

(58) Field of Classification Search
CPC .......... G02F 1/133528; G02F 1/13363; G02F 1/133632; C08K 5/0025; C09J 129/04;
(Continued)

(56) References Cited

U.S. PATENT DOCUMENTS 7,223,452 B2 *    5/2007    Murakami ............ B29C 55/026
349/118
2006/0182896 A1    8/2006    Murakami et al.
(Continued)

FOREIGN PATENT DOCUMENTS

CN    1550798 A    12/2004
CN    1774654 A    5/2006
(Continued)

OTHER PUBLICATIONS

Office Action dated Oct. 27, 2017, issued in Korean Application No. 10-2017-7009611, with English translation (7 pages).
(Continued)

*Primary Examiner* — Stephone B Allen
*Assistant Examiner* — Adam W Booher
(74) *Attorney, Agent, or Firm* — Westerman, Hattori, Daniels & Adrian, LLP

(57) ABSTRACT

The present invention pertains to a polarizing film having a transparent layer on at least one surface of a polarizer, wherein: the polarizer contains a polyvinyl alcohol-based resin and has a thickness of 15 μm or less; the transparent layer-side of the polarizer has a compatible layer thereon having compatibility with the transparent layer; and the thickness A of the polarizer and the thickness B of the compatible layer satisfy the general formula (100×B/A)≥1. This polarizing film has crack resistance and suppresses changes in the dimensions of the polarizer.

23 Claims, 1 Drawing Sheet

(30) Foreign Application Priority Data

| Feb. 13, 2015 | (JP) | ................................. | 2015-026586 |
| Sep. 28, 2015 | (JP) | ................................. | 2015-189275 |
| Sep. 28, 2015 | (JP) | ................................. | 2015-189276 |
| Sep. 28, 2015 | (JP) | ................................. | 2015-189278 |

(51) Int. Cl.
| *C09J 129/04* | (2006.01) |
| *C09J 133/02* | (2006.01) |
| *C09J 133/06* | (2006.01) |
| *G02B 5/30* | (2006.01) |
| *G02F 1/133* | (2006.01) |
| *G02F 1/13363* | (2006.01) |

(52) U.S. Cl.
CPC ........... *C09J 133/02* (2013.01); *C09J 133/06* (2013.01); *G02B 5/305* (2013.01); *G02B 5/3033* (2013.01); *G02F 1/133632* (2013.01)

(58) Field of Classification Search
CPC ...... C09J 133/02; C09J 133/04; C09J 133/06; G02B 5/30; G02B 5/3025; G02B 5/3033; G02B 5/3041; G02B 5/305
See application file for complete search history.

(56) References Cited

U.S. PATENT DOCUMENTS

| 2006/0227423 | A1 | 10/2006 | Saiki et al. |
| 2007/0207277 | A1 | 9/2007 | Mizushima et al. |
| 2008/0137187 | A1 | 6/2008 | Nishida et al. |
| 2009/0091826 | A1* | 4/2009 | Sugino .................. G02B 1/105 359/489.2 |
| 2009/0122401 | A1 | 5/2009 | Shinagawa et al. |
| 2010/0221455 | A1 | 9/2010 | Kim et al. |
| 2011/0043733 | A1 | 2/2011 | Suzuki et al. |
| 2011/0163281 | A1 | 7/2011 | Bae et al. |
| 2012/0055607 | A1 | 3/2012 | Kitagawa et al. |
| 2012/0055608 | A1 | 3/2012 | Kitagawa et al. |
| 2012/0055621 | A1 | 3/2012 | Goto et al. |
| 2012/0055622 | A1 | 3/2012 | Kitagawa et al. |
| 2012/0055623 | A1 | 3/2012 | Kitagawa et al. |
| 2012/0056211 | A1 | 3/2012 | Kitagawa et al. |
| 2012/0056340 | A1 | 3/2012 | Kitagawa et al. |
| 2012/0057104 | A1 | 3/2012 | Kitagawa et al. |
| 2012/0057231 | A1 | 3/2012 | Goto et al. |
| 2012/0058291 | A1 | 3/2012 | Kitagawa et al. |
| 2012/0058321 | A1 | 3/2012 | Goto et al. |
| 2012/0206804 | A1 | 8/2012 | Nam et al. |
| 2013/0141787 | A1 | 6/2013 | Kim et al. |
| 2013/0220525 | A1 | 8/2013 | Kunai |
| 2013/0299070 | A1 | 11/2013 | Kawamura |
| 2014/0057060 | A1 | 2/2014 | Fukagawa et al. |
| 2014/0065429 | A1 | 3/2014 | Kunikata et al. |
| 2014/0085722 | A1 | 3/2014 | Yasui et al. |
| 2014/0285887 | A1 | 9/2014 | Goto et al. |
| 2015/0070761 | A1 | 3/2015 | Kitagawa et al. |
| 2016/0363699 | A1 | 12/2016 | Kunai |

FOREIGN PATENT DOCUMENTS

| CN | 1860389 A | 11/2006 |
| CN | 101228462 A | 7/2008 |
| CN | 101387718 A | 3/2009 |
| CN | 101692133 A | 4/2010 |
| CN | 102754002 A | 10/2012 |
| CN | 102834748 A | 12/2012 |
| CN | 103135160 A | 6/2013 |
| CN | 103562759 A | 2/2014 |
| EP | 1 933 181 A1 | 6/2008 |
| JP | 9-104478 A | 4/1997 |
| JP | 10-308198 A | 11/1998 |
| JP | 2003-121618 A | 4/2003 |
| JP | 2004-61565 A | 2/2004 |
| JP | 2004-223993 A | 8/2004 |
| JP | 2005-43858 A | 2/2005 |
| JP | 2005-84113 A | 3/2005 |
| JP | 2009-169333 A | 7/2009 |
| JP | 2010-9027 A | 1/2010 |
| JP | 2011-221185 A | 11/2011 |
| JP | 2011-221278 A | 11/2011 |
| JP | 2011-227450 A | 11/2011 |
| JP | 2013-68804 A | 4/2013 |
| JP | 2013-72951 A | 4/2013 |
| JP | 2013-160775 A | 8/2013 |
| JP | 2013-254072 A | 12/2013 |
| JP | 2014-59547 A | 4/2014 |
| JP | 5504232 B2 | 5/2014 |
| JP | 2014-119501 A | 6/2014 |
| JP | 2014-206725 A | 10/2014 |
| JP | 2015-161782 A | 9/2015 |
| KR | 10-2006-0009837 A | 2/2006 |
| KR | 10-2010-0097076 A | 9/2010 |
| KR | 10-2011-0078782 A | 7/2011 |
| KR | 10-2012-0099172 A | 9/2012 |
| KR | 10-1326205 B1 | 1/2013 |
| KR | 10-2013-0018227 A | 2/2013 |
| KR | 10-2014-074260 A | 6/2014 |
| KR | 10-2014-0114733 A | 9/2014 |
| TW | 200801609 A | 1/2008 |
| TW | 201345962 A | 11/2013 |
| TW | 201430405 A | 8/2014 |
| TW | 201434643 A | 9/2014 |
| WO | 2009/099049 A1 | 8/2009 |
| WO | 2009/145150 A1 | 12/2009 |
| WO | 2011/125958 A1 | 10/2011 |
| WO | 2014/091894 A1 | 6/2014 |
| WO | 2015/194523 A1 | 12/2015 |

OTHER PUBLICATIONS

Office Action dated Nov. 9, 2017, issued in counterpart Korean Application No. 10-2017-7009610, with English translation (7 pages).
Office Action dated Oct. 27, 2017, issued in to Korean Application No. 10-2017-7009090, with English translation (9 pages).
Office Action dated Oct. 10, 2017, issued in Chinese Application No. 201580053060.2, with English translation (11 pages).
Office Action dated Oct. 16, 2017, issued in counterpart Chinese Application No. 201580053076.3 , with English translation (11 pages).
Office Action dated Oct. 27, 2017, issued in Korean Application No. 10-2017-7008777, with English translation (4 pages).
Office Action dated Aug. 19, 2016, issued in counterpart Japanese application No. 2015-189276, with English translation (8 pages).
Office Action dated Aug. 19, 2016, issued in counterpart Japanese application No. 2015-189278, with English translation (13 pages).
International Search Report dated Dec. 22, 2015, issued in counterpart International Application No. PCT/JP2015/077580 (2 pages).
Office Action dated May 9, 2017 issued in Taiwanese application No. 104132127 (counterpart to U.S. Appl. No. 15/515,885), with English translation. (6 pages).
Office Action dated Apr. 18, 2017, issued in counterpart Taiwanese Patent Application No. 104132122, with English translation. (6 pages).
Notification of Transmittal of Translation of the International Preliminary Report on Patentability (Form PCT/IB/338) issued in counterpart International Application No. PCT/JP2015/077580 dated Apr. 13, 2017 with Forms PCT/IB/373 and PCT/ISA/237. (6 pages).
Office Action dated Mar. 21, 2018, issued in Chinese Application No. 201580053094.1, with English translation. (15 pages).
Office Action dated Jan. 3, 2018 , issued in Chinese application No. 201580053067.4 which is counterpart to related U.S. Appl. No. 15/515,887, with English translation. (13 pages).
Notice of Allowance dated Feb. 27, 2018, issued in Korean application No. 10-2017-7009090 which is counterpart to related U.S. Appl. No. 15/515,385 (3 pages).

(56) References Cited

OTHER PUBLICATIONS

Office Action dated Feb. 26, 2018, issued in Korean application No. 10-2017-7009611 which is counterpart to related U.S. Appl. No. 15/515,885 (7 pages) with machine translation.
Office Action dated Mar. 20, 2018, issued in counterpart Chinese Application No. 201580053076.3, with English translation. (16 pages).
Notice of Allowance dated Mar. 28, 2018, issued in counterpart Korean Application No. 10-2017-7009610, with English translation. (5 pages).
Notice of Allowance dated Jun. 21, 2018, issued in Korean Patent Application No. 10-2017-7009611 (3 pages).
Office Action dated Oct. 31, 2018, issued in Chinese application No. 201580053067.4, (counterpart to U.S. Appl. No. 15/515,887) with English translation. (11 pages).
Office Action dated Jan. 14, 2019, issued in counterpart Chinese Patent Application No. 201580053066.X with English translation. (20 pages).

\* cited by examiner ized film produced with the polarizing film. The polarizing film or the pressure-sensitive-adhesive-layer-attached polarizing film may be used alone or as a component of a multilayer optical film to form an image display device such as a liquid crystal display (LCD) or an organic electroluminescent (EL) display.

POLARIZING FILM, PRESSURE-SENSITIVE-ADHESIVE-LAYER-ATTACHED POLARIZING FILM, AND IMAGE DISPLAY DEVICE

TECHNICAL FIELD

The invention relates to a polarizing film. The invention also relates to a pressure-sensitive-adhesive-layer-attached polarizing film produced with the polarizing film. The polarizing film or the pressure-sensitive-adhesive-layer-attached polarizing film may be used alone or as a component of a multilayer optical film to form an image display device such as a liquid crystal display (LCD) or an organic electroluminescent (EL) display.

BACKGROUND ART

The image forming system of liquid crystal display devices has polarizing films placed as essential components on both sides of glass substrates that form the liquid crystal panel surfaces. A polarizing film generally used includes a polarizer and a protective film or films bonded to one or both surfaces of the polarizer with a polyvinyl alcohol-based adhesive or any other adhesive, in which the polarizer includes a polyvinyl alcohol-based film and a dichroic material such as iodine.

Polarizing films also have a problem in that in a harsh environment accompanied by thermal shock (e.g., a high-temperature test at 95° C. for 250 hours), the polarizer undergoes changes in shrinkage stress, so that cracks can easily occur entirely in the direction of the absorption axis of the polarizer. In other words, polarizing films have insufficient resistance to thermal shock-induced cracking in the harsh environment. In particular, a one-side-protected polarizing film including a polarizer and a protective film that is provided on only one surface of the polarizer for thickness reduction has a problem in that excessive stress can occur inside the polarizer due to the difference between the shrinkage stress on the protective film side of the polarizer and the shrinkage stress on the opposite side of the polarizer from the protective film, so that various cracks can easily occur, including very small cracks of several hundred in the absorption axis direction of the polarizer and through cracks passing through the entire surface.

In order to suppress the occurrence of the cracks, for example, it is proposed to provide a pressure-sensitive-adhesive-layer-attached polarizing film including a one-side-protected polarizing film, a protective layer provided on the polarizing film and having a tensile moduluselastic of 100 MPa or more, and a pressure-sensitive adhesive layer provided on the protective layer (Patent Document 1). It is also proposed to provide a pressure-sensitive-adhesive-layer-attached polarizing film including a polarizer with a thickness of 25 µm or less, a protective layer provided on one surface of the polarizer and including a product obtained by curing a curable resin composition, a protective film provided on the other surface of the polarizer, and a pressure-sensitive adhesive layer provided on the outer side of the protective layer (Patent Document 2). The pressure-sensitive-adhesive-layer-attached polarizing films described in Patent Documents 1 and 2 are effective in terms of suppressing the occurrence of cracks. In view of suppression of the occurrence of cracks, thickness reduction, and weight reduction, it is proposed to form a protective layer on at least one surface of a polarizer from a water-soluble, film-forming composition (polyvinyl alcohol-based resin composition) (Patent Document 3).

PRIOR ART DOCUMENTS

Patent Documents

Patent Document 1: JP-A-2010-009027
Patent Document 2: JP-A-2013-160775
Patent Document 3: JP-A-2005-043858

SUMMARY OF THE INVENTION

Problems to be Solved by the Invention

According to Patent Documents 1 to 3, the protective layer can somewhat suppress the shrinkage of the polarizer in its absorption axis direction and thus suppress the occurrence of cracks. However, it is not considered that the protective layer can sufficiently suppress the dimensional changes due to the shrinkage stress in the polarizer.

In addition, polarizers have also been reduced in thickness. When a thinner polarizer is used to form a polarizing film, the polarizer will undergo smaller changes in shrinkage stress. However, when the polarizer itself is reduced in thickness, the polarizer can be cracked even by a force weaker than usual. Therefore, sufficient crack resistance cannot be achieved even by a thin polarizer.

Polarizers are typically produced by a process including the step of stretching a polyvinyl alcohol-based film. Therefore, even thin polarizers have residual stress in the interior when obtained after the stretching step of the production process. When the thermal shock test is performed on a general polarizing film including a polarizer and any type of protective film or films bonded to one or both surfaces of the polarizer, residual stress on the protective film occurs in combination with residual stress on the polarizer, so that the polarizing film exhibits shrinkage behavior as a whole. Thus, even with respect to thin polarizers, it has been impossible to sufficiently suppress shrinkage stress-induced dimensional changes of polarizers, particularly in a high-temperature test performed at temperatures (e.g., 85° C. or higher) near and equal to or higher than the Tg of polyvinyl alcohol resin used to form polarizers.

It is an object of the invention to provide a polarizing film that includes a polarizer and a transparent layer on at least one surface of the polarizer, resists cracking in a high-temperature environment at 85° C. or higher, and allows the polarizer to resist dimensional changes. It is another object of the invention to provide a pressure-sensitive-adhesive-layer-attached polarizing film produced with such a polarizing film. The invention is further directed to an image display device having such a polarizing film or such a pressure-sensitive-adhesive-layer-attached polarizing film.

Means for Solving the Problems

As a result of intensive studies, the inventors have accomplished the invention based on findings that the problems can be solved by the polarizing film, and other means described below.

That is, the present invention relates to a polarizing film comprising:

a polarizer comprising a polyvinyl alcohol-based resin and having a thickness of 15 µm or less;

a transparent layer provided on at least one surface of the polarizer; and a compatible layer that is compatible with the transparent layer and provided in a transparent layer-side portion of the polarizer, wherein the polarizer and the compatible layer have a thickness A and a thickness B, respectively, satisfying the general formula: $(100 \times B/A) \geq 1$.

In the polarizing film, the compatible layer preferably has a boric acid concentration lower than that of a portion of the polarizer other than the compatible layer.

Further, the present invention relates to a polarizing film comprising:

a polarizer comprising a polyvinyl alcohol-based resin and having a thickness of 15 μm or less;

a transparent layer provided on at least one surface of the polarizer; and a low-boric-acid-concentration layer that is provided in a transparent layer-side portion of the polarizer and has a boric acid concentration lower than that of any other portion of the polarizer, wherein the polarizer and the low-boric-acid-concentration layer have a thickness A and a thickness C, respectively, satisfying the general formula: $(100 \times C/A) \geq 1$.

In the polarizing film, the transparent layer preferably has a thickness of 0.2 μm or more. Further, the transparent layer preferably has a thickness of 6 μm or less.

In the polarizing film, the transparent layer preferably has an orientation index of 0.05 or less.

In the polarizing film, the transparent layer preferably is a product made from a layer-forming material comprising a polyvinyl alcohol-based resin. The polyvinyl alcohol-based resin preferably has a saponification degree of 99% by mole or more and an average degree of polymerization of 2,000 or more.

In the polarizing film, the polarizer preferably is designed to have a single-body transmittance T and a polarization degree P representing optical properties satisfying the condition of the following formula: $P > -(10^{0.929T-42.4} - 1) \times 100$ (provided that T<42.3) or P≥99.9 (provided that T≥42.3).

The polarizing film may have further a protective film.

Further, the present invention relates to a pressure-sensitive-adhesive-layer-attached polarizing film comprising: the polarizing film; and a pressure-sensitive adhesive layer.

Further, the present invention relates to an image display device comprising the polarizing film or the pressure-sensitive-adhesive-layer-attached polarizing film.

Effect of the Invention

In the polarizing film of the invention, the transparent layer is provided on the polarizer, which makes it possible to suppress the occurrence of cracks in a high-temperature environment at 85° C. or higher. In addition, the polarizing film of the invention has a compatible layer that is compatible with the transparent layer and provided in a transparent layer-side portion of the polarizer. The compatible layer is formed at and near the surface of the polarizer when a part of the transparent layer-forming material is allowed to penetrate into the polarizer and a component at and near the surface of the polarizer is allowed to leak out. The compatible layer with such features can be formed by forming the transparent layer on the surface of the polarizer using a material capable of penetrating into the polarizer.

A general polarizer is typically produced through the step of stretching a polyvinyl alcohol-based resin (film). Therefore, the resin molecules in the resulting polarizer are oriented with a certain degree of regularity. In contrast, the transparent layer is formed on the surface of the polarizer, for example, by a coating process. Therefore, the transparent layer does not undergo any stretching step, and the molecules in the transparent layer are not regularly oriented. As mentioned above, the compatible layer according to the invention is formed when the transparent layer-forming component is allowed to penetrate into the polarizer. In the process of forming the transparent layer, the component penetrating into the polarizer can act to partially relieve the orientation of the molecules in the polarizer. It is suggested that this action may lead to relaxation of the residual stress in the polarizer and to suppression of dimensional changes of the polarizer. It will be understood that this suggested mechanism is not intended to limit the invention.

In addition, the polarizing film of the invention includes a thin polarizer with a thickness of 15 μm or less. Thinner polarizers undergo smaller changes in shrinkage stress but have insufficient crack resistance due to their smaller thickness. Even though having a thin polarizer, the polarizing film of the invention can have improved crack resistance because it has the transparent layer.

MODE FOR CARRYING OUT THE INVENTION

Figure 1A:
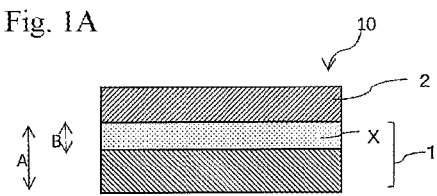
FIGS. 1A and 1B are a schematic cross-sectional view of an example of the polarizing film of the invention.
Figure 1B:
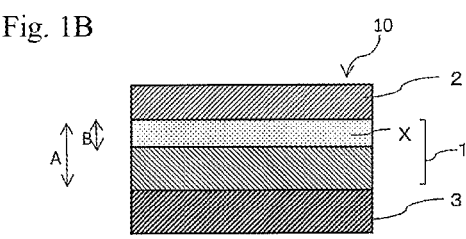

Hereinafter, the polarizing film of the invention 10 or 11 will be described with reference to FIGS. 1A, 1B, 2A, 2B, and 2C. The polarizing film 10 or 11 includes a polarizer 1 and a transparent layer 2. As shown in FIGS. 1A, 1B, 2A, 2B, and 2C, the polarizing film 10 or 11 of the invention also includes a compatible layer X that is compatible with the transparent layer 2 and provided in a transparent layer 2-side portion of the polarizer 1. FIG. 1A shows only the polarizer 1, the compatible Layer X, and transparent layer 2. As shown in FIG. 1B, however, a resin substrate 3 may be provided on the polarizer 1 side of the film shown in FIG. 1A. The resin substrate 3 may be, for example, a resin substrate used in the production of the polarizer 1 of a thin type.

Figure 2A:
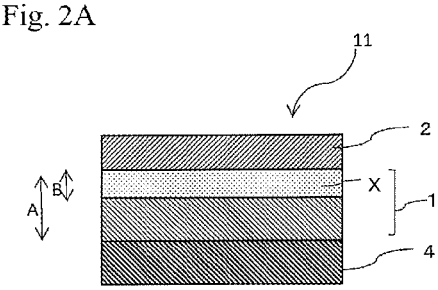
FIGS. 2A, 2B, and 2C are a schematic cross-sectional view of an example of the polarizing film of the invention.
Figure 2C:
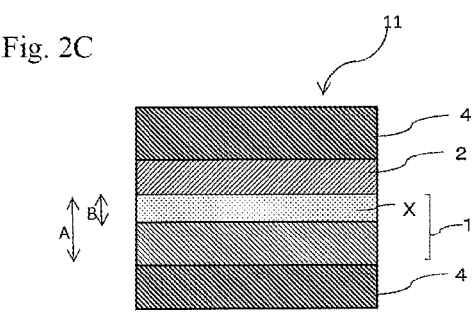
Figure 2B:
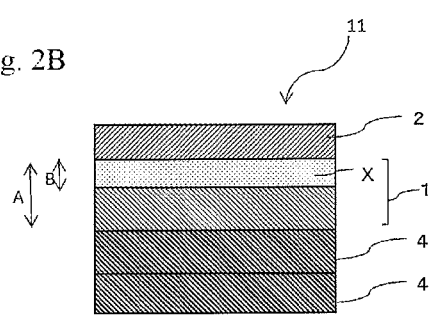

The polarizing film 11 shown in FIGS. 2A, 2B, and 2C also includes a protective film or films 4 on the polarizing film 10 of FIG. 1A. A protective film or films 4 may be provided on one or both surfaces of the polarizing film 10 of FIG. 1A. As shown in FIG. 2A, the protective film 4 may be provided only on the polarizer 1 side. Alternatively, the protective film 4 may be provided only on the transparent layer 2 side. FIG. 2B shows a case where protective films 4 are provided on both sides of the polarizing film 10 of FIG. 1A. A stack of two or more protective films 4 may also be used. FIG. 2C shows a case where two protective films 4 are stacked on one side of the polarizer 1. Although not shown in FIG. 2A, 2B, or 2C, an intervening layer such as an adhesive layer, a pressure-sensitive adhesive layer, or an undercoat layer (primer layer) is provided between the polarizer 1 or the transparent layer 2 and the protective film 4 stacked on each other. Although not shown, an adhesion facilitating layer or an activation treatment may be formed or performed on the protective film 4, and the adhesion facilitating layer and an adhesive layer may be stacked on each other.

Although not shown, a pressure-sensitive adhesive layer may also be provided on the polarizing film 10 or 11 of the invention. A separator may be further provided on the pressure-sensitive adhesive layer. In addition, a surface protective film may be provided on the polarizing film 10 or 11 of the invention (particularly in the case where the protective film 4 is provided).

In the polarizing film 10 or 11 of the invention, the compatible layer X is formed by allowing the transparent layer 2-forming component to penetrate through the surface of the polarizer 1 to its interior. The compatible layer X can relieve the residual stress in the polarizer 1. This makes it possible to suppress dimensional changes of the polarizer. From this point of view, in the invention, the thickness A of the polarizer 1 and the thickness B of the compatible layer are controlled to satisfy the general formula: $(100 \times B/A) \geq 1$. The thickness B of the compatible layer X is controlled in relation with the thickness A of the polarizer 1. In order to relieve the residual stress in the polarizer, the value ($100 \times B/A$) is preferably 2 or more, more preferably 2.5 or more, even more preferably 3 or more, further more preferably 4 or more, still more preferably 5 or more. On the other hand, if the value ($100 \times B/A$) is too large, the ratio of the thickness B of the compatible layer X to the thickness A of the polarizer 1 will be too high, which may lead to degradation of the optical properties. From these points of view, the value ($100 \times B/A$) is preferably 10 or less, more preferably 7 or less.

The thickness B of the compatible layer X can be measured by the method described in the EXAMPLES section.

<Polarizer>

The polarizer to be used may be of any type. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film, or may be a polyene-based oriented film such as a film of a dehydration product of polyvinyl alcohol or a dehydrochlorination product of polyvinyl chloride. Among these polarizers, a polarizer including a polyvinyl alcohol-based film and a dichroic material such as iodine is preferred.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

The polarizer used is a thin polarizer with a thickness of 15 µm or less. In view of thickness reduction and resistance to thermal shock-induced cracks, the polarizer preferably has a thickness of 12 µm or less, more preferably 10 µm or less, even more preferably 8 or less, further more preferably 7 µm or less, still more preferably 6 µm or less. On the other hand, the polarizer preferably has a thickness of 2 µm or more, more preferably 3 µm or more. The polarizer with such a small thickness is less uneven in thickness, has good visibility, and is less dimensionally-variable and thus has high durability to thermal shock.

In view of stretching stability and optical durability, the polarizer preferably contains boric acid. In order to suppress the occurrence of cracks such as through cracks and the like, the content of boric acid in the polarizer is preferably 25% by weight or less, more preferably 20% by weight or less, even More preferably 18% by weight or less, further more preferably 16% by weight or less, based on the total weight of the polarizer. If the content of boric acid in the polarizer is more than 20% by weight, shrinkage stress in the polarizer can increase to make cracks such as through cracks and the like more likely to occur even when the thickness of the polarizer is controlled to 10 µm or less, which is not preferred. On the other hand, in view of the stretching stability and optical durability of the polarizer, the boron content is preferably 10% by weight or more, more preferably 12% by weight or more, based on the total weight of the polarizer.

Typical examples of the thin polarizer with a thickness of 15 µm or less include the thin polarizers described in, for example, JP-B1-4751486, JP-B1-4751481, JP-B1-4815544, JP-B1-5048120, JP-B1-5587517, WO 2014/077599 A, and WO 2014/077636 A or thin polarizers obtained by the production methods described in these publications.

The polarizer is preferably designed to have a single-body transmittance T and a polarization degree P that represent optical properties satisfying the condition of the following formula: $P > -(10^{0.929T-42.4} - 1) \times 100$ (provided that $T < 42.3$) or $P \geq 99.9$ (provided that $T \geq 42.3$). The polarizer designed to satisfy the condition uniquely has the performance required for a liquid crystal television display having a large display element. Specifically, such a display is required to have a contrast ratio of 1,000:1 or more and a maximum brightness of 500 cd/m² or more. In other applications, for example, the polarizer is bonded to the viewer side of an organic EL display device.

The thin polarizer described above should be produced by a process capable of achieving high-ratio stretching to improve polarizing performance, among processes including the steps of stretching and dyeing a laminate. From this point of view, the thin polarizer is preferably obtained by a process including the step of stretching in an aqueous boric acid solution as described in JP-B1-4751486, JP-B1-4751481, or JP-B1-4815544, and more preferably obtained by a process including the step of performing auxiliary in-air stretching before stretching in an aqueous boric acid solution as described in JP-B1-4751481 or JP-B1-4815544. These thin polarizers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

<Resin Substrate>

The resin substrate shown in FIG. 1B (the resin substrate for stretching) may be the substrate used in the production of the thin polarizer. The material used to form the resin substrate may be any of various thermoplastic resins.

Examples of thermoplastic resins include ester-based resins such as polyethylene terephthalate-based resins, cycloolefin-based resins such as norbornene-based resins, olefin-based resins such as polypropylene, polyamide-based resins, polycarbonate-based resins, and copolymerized resins thereof. Among them, ester-based resins are preferred in view of ease of production and reduction in costs. A thermoplastic ester-based resin substrate may be used, which may be a thermoplastic amorphous ester-based resin substrate or a thermoplastic crystalline ester-based resin substrate.

<Protective Film>

The protective film is preferably made of a material having a high level of transparency, mechanical strength, thermal stability, water barrier properties, isotropy, and other properties. Examples of such a material include polyester-based polymers such as polyethylene terephthalate and polyethylene naphthalate, cellulose-based polymers such as diacetyl cellulose and triacetyl cellulose, acryl-based polymers such as polymethyl methacrylate, styrene-based polymers such as polystyrene and acrylonitrile-styrene copolymers (AS resins), and polycarbonate-based polymers. Examples of polymers that may be used to form the transparent protective film also include polyolefin-based polymers such as polyethylene, polypropylene, cyclo-based or norbornene-structure-containing polyolefin, and ethylene-propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinyl alcohol-based polymers, vinylidene chloride-based polymers, vinyl butyral-based polymers, arylate-based polymers, polyoxymethylene-based polymers, epoxy-based polymers, or any blends of the above polymers.

The protective film may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the protective film is preferably from 50 to 100% by weight, more preferably from 50 to 99% by weight, even more preferably from 60 to 98% by weight, further more preferably from 70 to 97% by weight. If the content of the thermoplastic resin in the protective film is 50% by weight or less, high transparency and other properties inherent in the thermoplastic resin may fail to be sufficiently exhibited.

The protective film may also be, for example, a retardation film, a brightness enhancement film, or a diffusion film. The retardation film may have an in-plane retardation of 40 nm or more and/or a thickness direction retardation of 80 nm or more. The in-plane retardation is generally adjusted to fall within the range of 40 to 200 nm, and the thickness direction retardation is generally adjusted to fall within the range of 80 to 300 nm. When a retardation film is used as the protective film, the retardation film can also serve as a polarizer protecting film, which contributes to thickness reduction.

The retardation film may be a birefringent film formed by subjecting a thermoplastic resin film to uniaxial or biaxial stretching. The stretching temperature, the stretch ratio, and other conditions may be appropriately selected depending on the retardation value, the film material, and the thickness.

The thickness of the protective film may be selected as needed. In general, the thickness of the transparent protective film is from about 1 to about 500 μm in view of strength, workability such as handleability, and thin layer formability. In particular, the thickness of the transparent protective film is preferably from 1 to 300 μm, more preferably from 5 to 200 μm, even more preferably from 5 to 150 μm, further more preferably from 20 to 100 μm for thickness reduction.

The surface of the protective film, opposite to its surface where the polarizer is bonded (particularly in the mode shown in FIG. 1), may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the protective film itself or as a layer independent of the protective film.

<Intervening Layer>

The protective film and the polarizer are laminated with an intervening layer, such as an adhesive layer, a pressure-sensitive adhesive layer, or an undercoat layer (primer layer), between them. In this case, the intervening layer should preferably be used to laminate them with no air gap between them.

The adhesive layer is made from an adhesive. Any of various types of adhesives may be used. The adhesive layer may be of any optically-transparent type. The adhesive may be any of various types, such as a water-based adhesive, a solvent-based adhesive, a hot melt-based adhesive, and an active energy ray-curable adhesive. A water-based adhesive or an active energy ray-curable adhesive is preferred.

The water-based adhesive may be, for example, an isocyanate-based adhesive, a polyvinyl alcohol-based adhesive, a gelatin-based adhesive, a vinyl-based adhesive, a latex-based adhesive, or a water-based polyester adhesive. The water-based adhesive is generally used in the form of an aqueous solution, which generally has a solids content of 0.5 to 60% by weight.

The active energy ray-curable adhesive is an adhesive capable of being cured by exposure to active energy rays such as electron beams or ultraviolet rays (a radically or cationically curable adhesive). The active energy ray-curable adhesive to be used may be of, for example, an electron beam-curable type or an ultraviolet-curable type. The active energy ray-curable adhesive may be, for example, a photo-radically curable adhesive. The photo-radically curable type active energy ray-curable adhesive may be of an ultraviolet-curable type. In this case, the adhesive should contain a radically polymerizable compound and a photopolymerization initiator.

The method for applying the adhesive is appropriately selected depending on the viscosity of the adhesive and the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

For example, when the water-based adhesive is used, the adhesive is preferably applied in such a manner that the finally formed adhesive layer can have a thickness of 30 to 300 nm. The adhesive layer more preferably has a thickness of 60 to 250 nm. On the other hand, when the active energy ray-curable adhesive is used, the adhesive layer is preferably formed with a thickness of 0.1 to 200 μm. The thickness is more preferably from 0.5 to 50 μm, even more preferably from 0.5 to 10 μm.

In the process of laminating the polarizer and the protective film, an adhesion-facilitating layer may be placed between the protective film and the adhesive layer. The adhesion-facilitating layer may be made of, for example, any of various resins having a polyester skeleton, a polyether skeleton, a polycarbonate skeleton, a polyurethane skeleton, a silicone skeleton, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

The adhesion-facilitating layer is usually provided in advance on the protective film, and then the adhesion-facilitating layer side of the protective film is bonded to the polarizer with the adhesive layer. The adhesion-facilitating layer can be formed using a known technique that includes applying an adhesion-facilitating-layer-forming material onto the protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 µm, more preferably 0.02 to 2 µm, even more preferably 0.05 to 1 µm. Two or more adhesion-facilitating layers may be provided. Also in this case, the total thickness of the adhesion-facilitating layers preferably falls within these ranges.

The pressure-sensitive adhesive layer is made from a pressure-sensitive adhesive. Any of various pressure-sensitive adhesives may be used, examples of which include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, and cellulose-based pressure-sensitive adhesives. The base polymer with adhesive properties is selected depending on the type of the pressure-sensitive adhesive. Among these pressure-sensitive adhesive adhesives, acryl-based pressure-sensitive adhesives are preferably used because they have a high level of optical transparency, weather resistance, heat resistance, and other properties, and exhibit an appropriate level of wettability and adhesive properties including cohesiveness and adhesiveness.

The undercoat layer (primer layer) is formed to improve the adhesion between the polarizer and the protective film. The primer layer may be made of any material capable of providing somewhat strong adhesion to both the base film and a polyvinyl alcohol-based resin layer. For example, a thermoplastic resin having a high level of transparency, thermal stability, and stretchability may be used to form the primer layer. Such a thermoplastic resin may be, for example, an acryl-based resin, a polyolefin-based resin, a polyester-based resin, a polyvinyl alcohol-based resin, or any mixture thereof.

<Transparent Layer>

Any of various layer-forming materials may be used to form the transparent layer. Examples of the material used to form the transparent layer include polyester-based resins, polyether-based resins, polycarbonate-based resins, polyurethane-based resins, silicone-based resins, polyamide-based resins, polyimide-based resins, PVA-based resins, and acryl-based resins. These resin materials may be used singly or in combination of two or more. Among them, one or more selected from the group consisting of polyurethane-based resins and PVA-based resins are preferred, and PVA-based resins are more preferred. The resin may also be a water-based resin or a solvent-based resin. The resin is preferably a water-based resin or a PVA-based resin. The water-based resin may be an aqueous acrylic resin solution or an aqueous urethane resin solution.

The thickness of the transparent layer is preferably 0.2 µm or more. The transparent layer with such a thickness can suppress the occurrence of cracks. The thickness of the transparent layer is preferably 0.5 µm or more, more preferably 0.7 µm or more. On the other hand, if the transparent layer is too thick, it will have a lower level of optical reliability and water resistance. Therefore, the thickness of the transparent layer is generally 8 µm or less, preferably 6 µm or less, more preferably 5 µm or less, even more preferably 3 µm or less. The thickness of the transparent layer refers to the thickness of the layer formed on the compatible layer.

In view of crack resistance, the transparent layer preferably has a low orientation index. The orientation index of the transparent layer is preferably controlled to 0.05 or less, more preferably 0.02 or less. Most preferably, the transparent layer has no orientation (or an orientation index of 0.01 or less). The orientation index of the transparent layer can be measured by the method described in the EXAMPLES section.

A material capable of penetrating into the polarizer is preferably used to form the transparent layer. The transparent layer is preferably made from, for example, a layer-forming material including a water-soluble polyvinyl alcohol-based resin as a main component.

The polyvinyl alcohol-based resin may be, for example, polyvinyl alcohol. Polyvinyl alcohol can be obtained by saponifying polyvinyl acetate. The polyvinyl alcohol-based resin may also be a product produced by saponifying a copolymer of vinyl acetate and any other monomer or monomers copolymerizable therewith. In this case, when the copolymerizable monomer is ethylene, an ethylene-vinyl alcohol copolymer can be obtained. Examples of the copolymerizable monomer include unsaturated carboxylic acids such as maleic acid (anhydride), fumaric acid, crotonic acid, itaconic acid, and (meth)acrylic acid, and esters thereof; α-olefins such as ethylene and propylene; (sodium) (meth)allylsulfonate, sodium sulfonate (monoalkyl maleate), sodium disulfonate alkyl maleate, N-methylolacrylamide, acrylamide alkyl sulfonate alkali salts, N-vinylpyrrolidone, and N-vinylpyrrolidone derivatives. These polyvinyl alcohol-based resins may be used alone or in combination of two or more. In view of the transparent layer can have a satisfactory level of moist heat resistance or water resistance, the polyvinyl alcohol-based resin is preferably polyvinyl alcohol obtained by saponifying polyvinyl acetate.

The polyvinyl alcohol-based resin to be used may have a saponification degree of, for example, 95% by mole or more. In view of the transparent layer can have a satisfactory level of moist heat resistance or water resistance, the polyvinyl alcohol-based resin preferably has a saponification degree of 99% by mole or more, more preferably 99.7% by mole or more. The saponification degree indicates the proportion of the units actually saponified to vinyl alcohol units in the units capable of being converted to vinyl alcohol units by saponification, after which vinyl ester units can remain as residues. The saponification degree can be determined according to JIS K 6726-1994.

The polyvinyl alcohol-based resin to be used may have an average degree of polymerization of, for example, 500 or more. In view of the transparent layer can have a satisfactory level of moist heat resistance or water resistance, the polyvinyl alcohol-based resin preferably has an average degree of polymerization of 1,000 or more, more preferably 1,500 or more, even more preferably 2,000 or more. The average degree of polymerization of the polyvinyl alcohol-based resin can be measured according to JIS K 6726.

The polyvinyl alcohol-based resin to be used may also be a modified polyvinyl alcohol-based resin having a hydrophilic functional group on the side chain of the polyvinyl alcohol or copolymerized polyvinyl alcohol. The hydrophilic functional group may be, for example, an acetoacetyl group or a carbonyl group. Other examples of the polyvinyl alcohol resin that may be used include modified polyvinyl alcohols obtained by, for example, acetalization, urethanation, etherification, or phosphorylation of polyvinyl alcohol resin or grafting on polyvinyl alcohol resin.

The transparent layer may be formed from a layer-forming material containing no curable component. For example, the transparent layer may be formed from a layer-forming material including the polyvinyl alcohol-based resin (PVA-based resin) as a main component. The polyvinyl alcohol-based resin used to form the transparent layer may be the same as or different from the polyvinyl alcohol-based resin in the polarizer as long as it falls under the category of "polyvinyl alcohol-based resin."

The layer-forming material containing the polyvinyl alcohol-based resin as a main component may contain a curable component (crosslinking agent). The content of the polyvinyl alcohol-based resin in the transparent layer or the layer-forming material (solid basis) is preferably 80% by weight or more, more preferably 90% by weight or more, even more preferably 95% by weight or more. But the layer-forming material is preferably free of any curable component (crosslinking agent).

A compound having at least two functional groups reactive with the polyvinyl alcohol-based resin may be used as the crosslinking agent. Examples of such a compound include alkylenediamines having an alkylene group and two amino groups, such as ethylenediamine, triethylenediamine, and hexamethylenediamine; isocyanates such as tolylene diisocyanate, hydrogenated tolylene diisocyanate, trimethylolpropane tolylene diisocyanate adducts, triphenylmethane triisocyanate, methylene bis(4-phenylmethanetriisocyanate, isophorone diisocyanate, and ketoxime blocked compounds thereof or phenol blocked compounds thereof; epoxies such as ethylene glycol diglycidyl ether, polyethylene glycol diglycidyl ether, glycerin di- or triglycidyl ether, 1,6-hexanediol diglycidyl ether, trimethylolpropane triglycidyl ether, diglycidyl aniline, and diglycidyl amine; monoaldehydes such as formaldehyde, acetaldehyde, propionaldehyde, and butylaldehyde; dialdehydes such as glyoxal, malondialdehyde, succindialdehyde, glutardialdehyde, maleic dialdehyde, and phthaldialdehyde; amino-formaldehyde resins such as condensates of formaldehyde with methylolurea, methylolmelamine, alkylatedmethylolurea, alkylated methylolmelamine, acetoguanamine, or benzoguanamine; dicarboxylic acid dihydrazides such as adipic acid dihydrazide, oxalic acid dihydrazide, malonic acid dihydrazide, succinic acid dihydrazide, glutaric acid dihydrazide, isophthalic acid dihydrazide, sebacic acid dihydrazide, maleic acid dihydrazide, fumaric acid dihydrazide, and itaconic acid dihydrazide; water-soluble dihydrazines such as ethylene-1,2-dihydrazine, propylene-1,3-dihydrazine, and butylene-1,4-dihydrazine; and salts and oxides of sodium, potassium, magnesium, calcium, aluminum, iron, nickel, and other bivalent or trivalent metals. Among them, amino-formaldehyde resins and water-soluble dihydrazines are preferred. The amino-formaldehyde resins are preferably methylol group-containing compounds. Methylolmelamine is particularly preferred among the methylol group-containing compounds.

The curable component (crosslinking agent) may be used to improve water resistance, in which the content of the curable component (crosslinking agent) is preferably 20 parts by weight or less, 10 parts by weight or less, or 5 parts by weight or less, based on 100 parts by weight of the polyvinyl alcohol-based resin.

The layer-forming material may be prepared as a solution by dissolving the polyvinyl alcohol-based resin in a solvent. Examples of the solvent include water, dimethyl sulfoxide, dimethylformamide, dimethylacetamide, N-methylpyrrolidone, various glycols, polyhydric alcohols including trimethylolpropane, and amines such as ethylenediamine and diethylenetriamine. These solvents may be used alone or in combination of two or more. Among them, water is preferably used as the solvent to form the layer-forming material as an aqueous solution. The concentration of the polyvinyl alcohol-based resin in the layer-forming material (e.g., an aqueous solution) may be, but not limited to, 0.1 to 15% by weight, preferably 0.5 to 10% by weight, in view of coatability, shelf stability, and other properties.

An additive may also be added as appropriate to the layer-forming material (e.g., aqueous solution). Examples of the additive include a plasticizer, a surfactant or the like. The plasticizer may be, for example, a polyhydric alcohol such as ethylene glycol or glycerin. The surfactant may be, for example, a nonionic surfactant. The layer-forming material may also contain a coupling agent such as a silane coupling agent or a titanium coupling agent, any of various tackifiers, an ultraviolet absorber, an antioxidant, and a stabilizer such as a heat-resistant stabilizer or a hydrolysis-resistant stabilizer.

The transparent layer may be formed by applying the layer-forming material to the other surface of the polarizer (the surface opposite to its surface on which the protective film is provided) and drying the material. The layer-forming material is preferably applied in such a manner that a 0.2-μm-thick coating can be formed after drying. The application process is not limited, and any appropriate method may be used in the application process. For example, roll coating, spin coating, wire bar coating, dip coating, die coating, curtain coating, spray coating, knife coating, (such as comma coating), or various other methods may be used. In general, the drying temperature is preferably from 60 to 120° C., more preferably from 70 to 100° C. The drying time is preferably from 10 to 300 seconds, more preferably from 20 to 120 seconds.

<Pressure-Sensitive Adhesive Layer>

A pressure-sensitive adhesive layer may be provided on the polarizing film to form a pressure-sensitive-adhesive-layer-attached polarizing film for use. The pressure-sensitive adhesive layer may be provided on the transparent layer or polarizer side of the polarizing film. When the polarizing film has a protective film, the pressure-sensitive adhesive layer may be provided on the protective film. A separator may be provided on the pressure-sensitive adhesive layer of the pressure-sensitive-adhesive-layer-attached polarizing film.

The pressure-sensitive adhesive layer may be formed using any appropriate type of pressure-sensitive adhesive. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

Among these pressure-sensitive adhesives, those having a high level of optical transparency and weather resistance or heat resistance and exhibiting an appropriate level of wettability and adhesive properties such as cohesiveness and adhesiveness are preferably used. An acryl-based pressure-sensitive adhesive is preferably used because it has such properties.

The pressure-sensitive adhesive layer can be formed by a method including applying the pressure-sensitive adhesive to a release-treated separator or other means, removing the polymerization solvent and other components from the adhesive by drying to form a pressure-sensitive adhesive layer, and then transferring the pressure-sensitive adhesive layer onto the transparent layer or the protective film in the embodiment of FIG. 2A or 2B (or onto the protective film in the embodiment of FIG. 2C). Alternatively, the pressure-sensitive adhesive layer can be formed by a method including applying the pressure-sensitive adhesive to the transparent layer or the protective film in the embodiment of FIG. 2A or 2B (or to the protective film in the embodiment of FIG. 2C) and removing the polymerization solvent and other components from the adhesive by drying to form a pressure-sensitive adhesive layer on the polarizer. In the process of applying the pressure-sensitive adhesive, if necessary, one or more solvents other than the polymerization solvent may be newly added to the adhesive.

A silicone release liner is preferably used as the release-treated separator. In the invention, the pressure-sensitive adhesive may be applied to such a liner and then dried to form a pressure-sensitive adhesive layer. In this process, any appropriate method may be used for drying the pressure-sensitive adhesive, depending on purpose. Preferably, a method of heating and drying the coating film is used. The heating and drying temperature is preferably from 40° C. to 200° C., more preferably from 50° C. to 180° C., even more preferably from 70° C. to 170° C. When the heating temperature is set in the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, even more preferably from 10 seconds to 5 minutes.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or other means.

The thickness of the pressure-sensitive adhesive layer is typically, but not limited to, about 1 to about 100 µm, preferably 2 to 50 µm, more preferably 2 to 40 µm, even more preferably 5 to 35 µm.

When the pressure-sensitive adhesive layer is exposed, the pressure-sensitive adhesive layer may be protected by a release-treated sheet (separator) until it is actually used.

Examples of the material used to form such a separator include a plastic film such as a polyethylene, polypropylene, polyethylene terephthalate, or polyester film, a paper, a cloth, a porous material such as nonwoven fabric, and appropriate thin materials such as a net, a foamed sheet, a metal foil, and any laminate thereof. A plastic film is preferably used because of its good surface smoothness.

Such a plastic film may be of any type capable of protecting the pressure-sensitive adhesive layer. Such a plastic film may be, for example, a polyethylene film, a polypropylene film, a polybutene film, a polybutadiene film, a polymethylpertere film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 µm, preferably about 5 to about 100 µm. If necessary, the separator may be subjected to a release treatment and an anti-pollution treatment with a silicone-based, fluoride-based, long-chain alkyl-based, or fatty acid amide-based release agent, a silica powder, or other materials, or subjected to an antistatic treatment of coating type, kneading and mixing type, vapor-deposition type, or other types. In particular, when the surface of the separator is appropriately subjected to a release treatment such as a silicone treatment, a long-chain alkyl treatment, or a fluorine treatment, the releasability from the pressure-sensitive adhesive layer can be further improved.

<Surface Protective Film>

A surface protective film may be provided on the polarizing film. The surface protective film generally has a base film and a pressure-sensitive adhesive layer. The surface protective film protects the polarizer with the pressure-sensitive adhesive layer interposed between them.

In view of the ability to be tested or managed, an isotropic or nearly-isotropic film material should be selected as the base film for the surface protective film. Examples of such a film material include polyester-based resins such as polyethylene terephthalate films, cellulose-based resins, acetate-based resins, polyethersulfone-based resins, polycarbonate-based resins, polyamide-based resins, polyimide-based resins, polyolefin-based resins, acryl-based resins, and other transparent polymers. In particular, polyester-based resins are preferred. The base film may be made of a single film material or a laminate of two or more film materials. The base film may also be a product obtained by stretching the film. The base film generally has a thickness of 500 µm or less, preferably 10 to 200 µm.

The pressure-sensitive adhesive used to form the pressure-sensitive adhesive layer for the surface protective film may be appropriately selected from pressure-sensitive adhesives including, as a base polymer, a (meth)acryl-based polymer, a silicone-based polymer, polyester, polyurethane, polyamide, polyether, fluoride-based polymer, rubber-based polymer, or any other polymer. An acryl-based pressure-sensitive adhesive containing an acryl-based polymer as a base polymer is preferred in view of transparency, weather resistance, heat resistance, and other properties. The thickness (dry thickness) of the pressure-sensitive adhesive layer is selected depending on the desired adhesive strength. The thickness of the pressure-sensitive adhesive is generally from about 1 to about 100 µm, preferably from 5 to 50 µm.

A silicone, long-chain alkyl, or fluorine treatment with a low-adhesion material may also be performed to form a release treatment layer on the surface of the base film of the surface protective film, opposite to its surface on which the pressure-sensitive adhesive layer is provided.

<Other Optical Layers>

For practical use, the polarizing film of the invention may be laminated with any other optical layer or layers to form an optical film. As a non-limiting example, such an optical layer or layers may be one or more optical layers that have ever been used to form liquid crystal display devices or other devices, such as a reflector, a transflector, a retardation plate (including a wavelength plate such as a half or quarter wavelength plate), or a viewing angle compensation film. Particularly preferred is a reflective or transflective polarizing film including a laminate of the polarizing film of the invention and a reflector or a transflector, an elliptically or circularly polarizing film including a laminate of the polarizing film of the invention and a retardation plate, a wide viewing angle polarizing film including a laminate of the polarizing film of the invention and a viewing angle compensation film, or a polarizing film including a laminate of the polarizing film of the invention and a brightness enhancement film.

The optical film including a laminate of the above optical layer and the polarizing film may be formed by a method of stacking them one by one, for example, in the process of manufacturing a liquid crystal display device. However, the optical film should be formed by stacking them in advance, which is superior in quality stability or assembling workability and thus advantageous in facilitating the process of manufacturing liquid crystal display devices or other devices. In the lamination, any appropriate bonding means such as a pressure-sensitive adhesive layer may be used. When the polarizing film and any other optical film are bonded together, their optical axes may be each aligned at an appropriate angle, depending on the desired retardation properties or other desired properties.

The polarizing film or the optical film according to the invention is preferably used to form various devices such as liquid crystal display devices or the like. Liquid crystal display devices may be formed according to conventional techniques. Specifically, a liquid crystal display device may be typically formed according to any conventional techniques by appropriately assembling a liquid crystal cell, polarizing films or optical films, and optional components such as a lighting system, incorporating a driving circuit, and performing other processes, except that the polarizing film or the optical film according to the invention is used. The liquid crystal cell to be used may also be of any type, such as IPS type or VA type. The invention is particularly suitable for IPS type.

Any desired liquid crystal display device may be formed, such as a liquid crystal display device including a liquid crystal cell and the polarizing film or films, or the optical film or films placed on one or both sides of the liquid crystal cell, or a liquid crystal display device further including a backlight or a reflector in the lighting system. In such a case, the polarizing film or films or the optical film or films according to the invention may be placed on one or both sides of the liquid crystal cell. When the polarizing films or the optical films are provided on both sides, they may be the same or different. The process of forming the liquid crystal display device may also include placing, at an appropriate position or positions, one or more layers of an appropriate component such as a diffusion plate, an antiglare layer, an anti-reflection film, a protective plate, a prism array, a lens array sheet, a light diffusion plate, or a backlight.

EXAMPLES

Hereinafter, the invention will be more specifically described with reference to examples. It will be understood that the examples shown below are not intended to limit the invention. In each example, "parts" and "%" are all by weight. Unless otherwise specified below, the conditions of standing at room temperature include 23° C. and 65% RH in all cases.

<Preparation of Optical Film Laminate A0>

A corona treatment was performed on one surface of an amorphous isophthalic acid-copolymerized polyethylene terephthalate (IPA-copolymerized PET) film substrate (100 μm in thickness) with a water absorption of 0.75% and a Tg of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-μm-thick PVA-based resin layer, so that a laminate was formed.

In an oven at 120° C., the resulting laminate was subjected to free-end uniaxial stretching to 2.0 times in the longitudinal direction between rolls at different peripheral speeds (auxiliary in-air stretching).

Subsequently, the laminate was immersed in an insolubilization bath (an aqueous boric acid solution obtained by adding 4 parts by weight of boric acid to 100 parts by weight of water) at a temperature of 30° C. for 30 seconds (insolubilization).

Subsequently, the laminate was immersed in a dyeing bath at a temperature of 30° C. while the iodine concentration and the immersion time were so controlled as to allow the resulting polarizing plate to have a predetermined transmittance. In this example, the laminate was immersed for 60 seconds in an aqueous iodine solution obtained by adding 0.2 parts by weight of iodine and 1.0 part by weight of potassium iodide to 100 parts by weight of water (dyeing).

Subsequently, the laminate was immersed for 30 seconds in a crosslinking bath (an aqueous boric acid solution obtained by adding 3 parts by weight of potassium iodide and 3 parts by weight of boric acid to 100 parts by Weight of water) at a temperature of 30° C. (crosslinking).

The laminate was then uniaxially stretched to a total stretch ratio of 5.5 times in the longitudinal direction between rolls at different peripheral speeds while it was immersed in an aqueous boric acid solution (an aqueous solution obtained by adding 4 parts by weight of boric acid and 5 parts by weight of potassium iodide to 100 parts by weight of water) at a temperature of 70° C. (in-water stretching).

The laminate was then immersed in a cleaning bath (an aqueous solution obtained by adding 4 parts by weight of potassium iodide to 100 parts by weight of water) at a temperature of 30° C. (cleaning).

The resulting product was an optical film laminate A0 including a 5-μm-thick polarizer.

<Preparation of Optical Film Laminate A1>

Optical film laminate A1 was obtained similarly to the method of preparing optical film laminate A0, except that the content of boric acid in the aqueous boric acid solution for in-water stretching was changed to 3.5 parts by weight. The resulting polarizer had a thickness of 5 μm.

<Preparation of Optical Film Laminate A2>

Optical film laminate A2 was obtained similarly to the method of preparing optical film laminate A0, except that the content of boric acid in the aqueous boric acid solution for in-water stretching was changed to 4.5 parts by weight. The resulting polarizer had a thickness of 5 μm.

<Preparation of Optical Film Laminate D>

Optical film laminate D was obtained similarly to the method of preparing optical film laminate A0, except that the PVA-based resin layer was formed with a thickness of 15 μm. The resulting polarizer had a thickness of 7 μm.

<Preparation of polarizer E>

A 30-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer E. The resulting polarizer had a thickness of 12 μm.

<Preparation of Polarizer F>

A 75-μm-thick polyvinyl alcohol film with an average degree of polymerization of 2,400 and a degree of saponification of 99.9% by mole was immersed in warm water at 30° C. for 60 seconds so that it was allowed to swell. Subsequently, the film was immersed in an aqueous solution of 0.3% iodine/potassium iodide (0.5/8 in weight ratio) and dyed while stretched to 3.5 times. The film was then stretched to a total stretch ratio of 6 times in an aqueous boric ester solution at 65° C. After the stretching, the film was dried in an oven at 40° C. for 3 minutes to give a PVA-based polarizer F. The resulting polarizer had a thickness of 23 μm.

(Preparation of Protective Film)

The adhesion facilitation-treated surface of a lactone ring structure-containing (meth)acrylic resin film with a thickness of 40 μm was subjected to a corona treatment. The corona-treated film was used as a protective film.

(Preparation of Adhesive to be Applied to Protective Film)

An ultraviolet-curable adhesive was prepared by mixing 40 parts by weight of N-hydroxyethylacrylamide (HEAR), 60 parts by weight of acryloylmorpholine (ACMO), and 3 parts by weight of a photo-initiator IRGACURE 819 (manufactured by BASF).

(Polyvinyl Alcohol-Based, Layer-Forming Material A)

An aqueous solution with a solid concentration of 4% by weight was prepared by dissolving, in pure water, a polyvinyl alcohol resin with a polymerization degree of 2,500 and a saponification degree of 99.0 mol %.

(Polyvinyl Alcohol-Based, Layer-Forming Material B)

An aqueous solution with a solid concentration of 4% by weight was prepared by dissolving, in pure water, a polyvinyl alcohol resin with a polymerization degree of 500 and a saponification degree of 99.0 mol %.

(Polyvinyl Alcohol-Based, Layer-Forming Material C)

An aqueous solution with a solid concentration of 4% by weight was prepared by dissolving, in pure water, a polyvinyl alcohol resin with a polymerization degree of 2,500 and a saponification degree of 89.0 mol %.

(Polyvinyl Alcohol-Based, Layer-Forming Material D)

An aqueous solution with a solid concentration of 4% by weight was prepared by dissolving, in pure water, a polyvinyl alcohol resin with a polymerization degree of 2,500 and a saponification degree of 99.7 mol %.

(Polyvinyl Alcohol-Based, Layer-Forming Material E)

An aqueous solution with a solid concentration of 4% by weight was prepared by dissolving 100 parts of a polyvinyl alcohol resin with a polymerization degree of 2,500 and a saponification degree of 99.7 mol % and 5 parts of methylolmelamine (WATERSOL S-695 (trade name) manufactured by DIC Corporation) as an additive in pure water.

(Composition of Acryl-Based, Layer-Forming Material A)

N-hydroxyethylacrylamide (HEAA (trade name) manufactured by KOHJIN Film & Chemicals Co., Ltd.) 20 parts Urethane acrylate (UV-17005 (trade name) manufactured by The Nippon Synthetic Chemical Industry Co., Ltd.) 80 parts Photo-radical polymerization initiator (2-methyl-1-(4-methylthiophenyl)-2-morpholinopropan-1-one (IRGACURE 907 (trade name) manufactured by BASF)) 3 parts Photosensitizer (diethyl thioxanthone (KAYACURE DETX-S (trade name) manufactured by Nippon Kayaku Co., Ltd.))

2 parts (Preparation of Active Energy Ray-Curable, Layer-Forming Material)

The acrylic, layer-forming material was mixed and stirred at 50° C. for 1 hour to form different active energy ray-curable, layer-forming materials.

(Active Energy Ray Irradiation)

Visible rays (gallium-containing metal halide lamp) were applied as active energy rays using the following conditions: irradiator, Light Hammer 10 manufactured by Fusion UV Systems, Inc; valve, V valve; peak illuminance, 1,600 mW/cm$^2$; total dose, 1,000/mJ/cm$^2$ (wavelength 380-440 nm). The illuminance of the visible rays was measured using Sola-Check System manufactured by Solatell Ltd.

Reference Example 1

<Preparation of One-Side-Protected Polarizing Film A>

The protective film was bonded to the surface of the polarizer of optical film laminate A0 with the ultraviolet-curable adhesive being applied to the surface in such a manner as to form a 0.5-μm-thick adhesive layer after curing. Subsequently, the adhesive was cured by the active energy ray irradiation. Subsequently, the amorphous PET substrate was removed, so that one-side-protected polarizing film A0 having the thin polarizer was obtained. The optical properties of resulting one-side-protected polarizing film A0 were as follows: transmittance 42.8%, polarization degree 99.99%.

Reference Examples 2 to 4

<Preparation of One-Side-Protected Polarizing Films A1, A2, and D>

One-side-protected polarizing film A1, A2, or D was obtained similarly to the method of preparing one-side-protected polarizing film A0 in Reference Example 1, except that optical film laminate A1, A2, or D was used instead of optical film laminate A0. The optical properties of resulting one-side-protected polarizing film A1, A2, or D were as follows: transmittance 42.8%, polarization degree 99.99%.

Reference Example 5

<Preparation of One-Side-Protected Polarizing Film E>

The protective film was bonded to one surface of polarizer E with the ultraviolet-curable adhesive being applied to the surface in such a manner as to form a 0.5-μm-thick adhesive layer after curing. Subsequently, the adhesive was cured by the active energy ray irradiation, so that one-side-protected polarizing film E was obtained. The optical properties of resulting one-side-protected polarizing film E were as follows: transmittance 42.8%, polarization degree 99.99%.

Reference Example 6

<Preparation of One-Side-Protected Polarizing Film F>

One-side-protected polarizing film F was obtained as in Reference Example 5, except that polarizer F was used instead of polarizer E. The optical properties of resulting one-side-protected polarizing film F were as follows: transmittance 42.8%, polarization degree 99.99%.

Example 1

<Preparation of Transparent Layer-Attached One-Side-Protected Polarizing Film A0 (Corresponding to FIG. 2A)>

Using a wire bar coater, polyvinyl alcohol-based, layer-forming material A (shown above) adjusted to 25° C. was applied to the polarizer surface of one-side-protected polarizing film A0 (obtained in Reference Example 1) (the surface of the polarizer opposite to its surface provided with the protective film) in such a manner that a 0.8-μm-thick coating (not including any compatible layer) could be formed after drying, and then dried with hot air at 80° C. for 30 seconds, so that transparent layer-attached one-side-protected polarizing film A0 was obtained.

Examples 2 to 10 and Comparative Examples 2 and 3

Transparent layer-attached one-side-protected polarizing film A0, A1, or A2 was prepared as in Example 1, except that the type of the transparent layer-forming material and the thickness of the transparent layer were changed as shown in Table 1.

In Comparative Example 2, the transparent layer was formed as described below.

Using a wire bar coater, the active energy ray-curable, layer-forming material (acrylic layer-forming material A) was applied to form a 1-μm-thick coating and then irradiated with active energy rays under a nitrogen atmosphere, so that transparent layer-attached one-side-protected polarizing film A0 was obtained. The optical properties of resulting transparent layer-attached one-side-protected polarizing film A0 were as follows: transmittance 42.8%, polarization degree 99.99%.

Examples 11 and 12 and Comparative Examples 4 and 5

<Preparation of Transparent Layer-Attached One-Side-Protected Polarizing Films D to F>

Transparent layer-attached one-side-protected polarizing films D to F were prepared as in Example 1, except that the type of the one-side-protected polarizing film, the type of the transparent layer-forming material, and the thickness of the transparent layer were changed as shown in Table 1. The optical properties of resulting transparent layer-attached one-side-protected polarizing films D to F were as follows: transmittance 42.8%, polarization degree 99.99%.

Comparative Example 1

(Preparation of Water-Based Adhesive)

An aqueous solution with an adjusted solid concentration of 3.7% was prepared by dissolving 100 parts of an acetoacetyl group-containing, polyvinyl alcohol-based resin (1,200 in average degree of polymerization, 98.5 mol % in saponification degree, 5 mol % in acetoacetylation degree) and 50 parts of methylolmelamine in pure water under conditions at a temperature of 30° C. A water-based adhesive was prepared by adding 18 parts of an aqueous alumina colloidal solution (15 nm in average particle size, 10% in solid concentration, positive charge) to 100 parts of the aqueous solution.

(Preparation of Polarizing Film)

A corona treatment was performed on one surface of an amorphous isophthalic acid-copolymerized polyethylene terephthalate (IPA-copolymerized PET) film substrate (100 μm in thickness) with a water absorption of 0.75% and a Tg of 75° C. An aqueous solution containing polyvinyl alcohol (2,500 in polymerization degree, 99.0 mol % in saponification degree) was applied to the corona-treated surface at 25° C. and dried to form a 1-μm-thick PVA resin layer, so that a laminate was formed. Subsequently, the water-based adhesive was applied to the polarizer surface of one-side-protected polarizing film A0 (the surface of the polarizer opposite to its surface provided with the protective film) to form a 0.1-μm-thick coating, which was then bonded to the PVA resin layer surface of the laminate and then dried at 60° C. for 1 minute. The PET film substrate was then removed, so that a transparent layer-attached one-side-protected polarizing film was formed.

Reference Example 7

<Preparation of One-Side-Protected Polarizing Film (Laminate) B>

The protective film was bonded to the polarizer surface of optical film laminate A0 with the ultraviolet-curable adhesive being applied to the surface in such a manner as to form a 0.5-μm-thick adhesive layer after curing. The protective film was further bonded to the protective film surface of the product with the ultraviolet-curable adhesive being applied to the surface in such a manner as to form a 0.5-μm-thick adhesive layer after curing. Ultraviolet rays were then applied as active energy rays to cure the adhesive.

Subsequently, the amorphous PET substrate was removed, so that one-side-protected polarizing film (laminate) B having the thin polarizer was obtained. The optical properties of resulting one-side-protected polarizing film (laminate) B were as follows: transmittance 42.8%, polarization degree 99.99%.

Example 13

<Preparation of Transparent Layer-Attached One-Side-Protected Polarizing Film (Laminate) (Corresponding to FIG. 2B)>

Using a wire bar coater, polyvinyl alcohol-based, layer-forming material A (shown above) adjusted to 25° C. was applied to the polarizer surface of one-side-protected polarizing film (laminate) B (obtained in Reference Example 7) (the surface of the polarizer opposite to its surface provided with the protective film) in such a manner that a 0.7-μm-thick coating could be formed after drying, and then dried with hot air at 60° C. for 1 minute, so that transparent layer-attached one-side-protected polarizing film (laminate) B was obtained. The optical properties of resulting transparent layer-attached one-side-protected polarizing film (laminate) B were as follows: transmittance 42.8%, polarization degree 99.99%.

Example 14

<Preparation of Transparent Layer-Attached Double-Side-Protected Polarizing Film C (Corresponding to FIG. 2C)>

Using a wire bar coater, polyvinyl alcohol-based, layer-forming material A (shown above) adjusted to 25° C. was applied to the polarizer surface of one-side-protected polarizing film A0 (obtained in Reference Example 1) (the surface of the polarizer opposite to its surface provided with the protective film) in such a manner that a 0.7-μm-thick coating could be formed after drying, and then dried with hot air at 60° C. for 1 minute, so that transparent layer-attached one-side-protected polarizing film (laminate) A0 was obtained. The protective film was bonded to the transparent layer surface of transparent layer-attached one-side-protected polarizing film A0 with the ultraviolet-curable adhesive being applied to the surface in such a manner as to form a 0.5-μm-thick adhesive layer after curing. Ultraviolet rays were then applied as active energy rays to cure the adhesive. The optical properties of resulting transparent layer-attached double-side-protected polarizing film C were as follows: transmittance 42.8%, polarization degree 99.99%.

Reference Example 8

<Preparation of Double-Side-Protected Polarizing Film C>

The protective film was bonded to the polarizer surface of one-side-protected polarizing film A0 (obtained in Reference Example 1) (the surface of the polarizer opposite to its surface provided with the protective film) with the ultraviolet-curable adhesive being applied to the surface in such a manner as to form a 0.5-μm-thick adhesive layer after curing. Ultraviolet rays were then applied as active energy rays to cure the adhesive. The optical properties of resulting double-side-protected polarizing film C were as follows: transmittance 42.8%, polarization degree 99.99%.

The polarizing films obtained in the examples and the comparative examples were evaluated as described below. Table 1 shows the results. The evaluation was performed on the pressure-sensitive-adhesive-layer-attached polarizing films prepared as described below.

<Measurement of the Content of Boric Acid in Polarizer>

The polarizers obtained in the examples and the comparative examples were subjected to attenuated total reflection (ATR) spectroscopy using polarized light as the measurement light and using a Fourier transform infrared spectrometer (FTIR) (Spectrum 2000 (trade name) manufactured by PerkinElmer, Inc.), in which the boric acid peak (665 cm$^{-1}$) intensity and the reference peak (2,941 cm$^{-1}$) intensity were measured. The boric acid amount index was calculated from the formula below using the resulting boric acid peak intensity and reference peak intensity, and then the boric acid content (% by weight) was determined from the formula below using the calculated boric acid amount index.

(Boric acid amount index)=(the intensity of the boric acid peak at 665 cm$^{-1}$)/(the intensity of the reference peak at 2,941 cm$^1$)

(Boric acid content (% by weight))=(boric acid amount index)×5.54+4.1

<Preparation of Acryl-Based Polymer>

A monomer mixture including 99 parts of butyl acrylate and 1 part of 4-hydroxybutyl acrylate was added to a four-necked flask equipped with a stirring blade, a thermometer, a nitrogen gas inlet tube, and a condenser. On the basis of 100 parts (solids) of the monomer mixture, 0.1 parts of 2,2'-azobisisobutyronitrile as a polymerization initiator was further added together with ethyl acetate to the flask. While the mixture was gently stirred, nitrogen gas was introduced to replace the air in the flask. Subsequently, the mixture was subjected to polymerization reaction for 7 hours while the temperature of the liquid in the flask was maintained at around 60° C. Subsequently, ethyl acetate was added to the resulting reaction liquid, so that a solution of an acryl-based polymer with a weight average molecular weight of 1,400,000 was obtained with an adjusted solid concentration of 30%.

(Preparation of Pressure-Sensitive Adhesive Composition)

An acryl-based pressure-sensitive adhesive solution was prepared by adding 0.1 parts of trimethylolpropane xylylene diisocyanate (TAKENATE D110N manufactured by Mitsui Chemicals, Inc.), 0.3 parts of dibenzoyl peroxide, and 0.075 parts of γ-gycldoxypropylmethoxysilane (KBM-403 manufactured by Shin-Etsu Chemical Co., Ltd.) to the acryl-based polymer solution based on 100 parts of the solids in the acryl-based polymer solution.

(Formation of Pressure-Sensitive Adhesive Layer)

Subsequently, the acryl-based pressure-sensitive adhesive solution was uniformly applied with a fountain coater to the surface of a polyethylene terephthalate film (separator film) treated with a silicone release agent, and then dried in an air circulation-type thermostatic oven at 155° C. for 2 minutes to form a 20-μm-thick pressure-sensitive adhesive layer on the surface of the separator film.

<Preparation of Pressure-Sensitive-Adhesive-Layer-Attached Polarizing Films>

Subsequently, a pressure-sensitive-adhesive-layer-attached polarizing film was prepared by bonding the pressure-sensitive adhesive layer formed on the release-treated surface of the release sheet (separator) to the transparent layer of the polarizing film obtained in each example (note that the transparent layer is on the polarizer side in Reference Examples 1 to 7 whereas the transparent layer is on one protective film in Reference Example 8).

<Determination of the Thickness of Compatible Layer>

Figure 3:
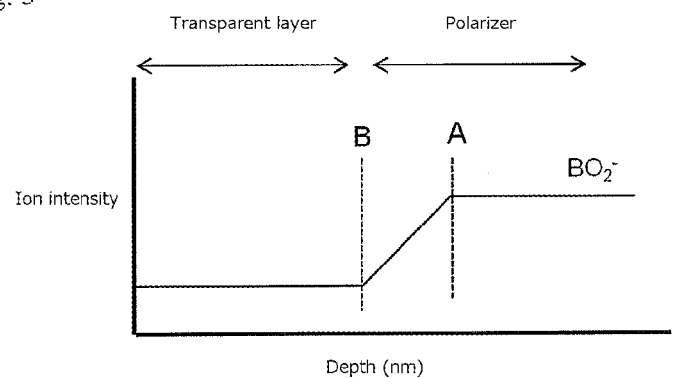
FIG. 3 is a graph for the measurement of the compatible layer.

The thickness of the compatible layer was measured with a time-of-flight secondary ion mass spectrometer (TOF-SIMS) equipped with a gas cluster ion gun. The value used of the thickness of the transparent layer (not including any compatible layer) of the polarizing film (sample) was accurately calculated in advance using a scanning electron microscope. While argon cluster etching was performed from the transparent layer side of the polarizing film (sample) toward its polarizer side, the depth profile was observed, in which $BO_2^-$ ions (ion intensity) derived from the polarizer were extracted. A graph for the depth (nm) from the transparent layer side and the $BO_2^-$ ions (ion intensity) was prepared as shown in FIG. 3. The thickness of the compatible layer was defined as the distance between A and B, wherein A is the point where the amount of $BO_2^-$ ions starts to decrease from the polarizer side to the transparent layer side, and B is the thickness of the transparent layer determined with the electron microscope. As a result of thickness measurement for Example 1 using a scanning electron microscope, the polarizer had a thickness of 5.0 μm while the transparent layer had a thickness of 0.8 μm. A graph as shown in FIG. 3 was obtained as a result of the measurement of the ion intensity with etching being performed from the transparent layer side using TOF-SIMS. In FIG. 3, the $BO_2^-$ ion intensity of the transparent layer was 0.8 while the $BO_2$ ion intensity of the polarizer was 3.5. As shown in FIG. 3, there was a $BO_2^-$ ion intensity gradient between A and B. The distance between A and B was calculated from the rate of argon cluster etching. As a result, the thickness of the compatible layer was calculated to be 0.12 μm. In addition, as a result of measurement using FTIR described above, the boric acid content was 4% at the transparent layer-side portion where the $BO_2^-$ ion intensity was 0.8. On the other hand, the polarizer, which had a $BO_2^-$ ion intensity of 3.5 as determined using TOF-SIMS, had a boric acid content of 16%, which was determined using FTIR before the formation of the transparent layer. It has been found from these results that the compatible layer in the polarizer has a boric acid content gradient (the compatible layer corresponds to a low-boric-acid-concentration layer with a boric acid concentration lower than that of the other portion of the polarizer).

<Orientation Index of Transparent Layer>

The measurement device used was a Fourier transform infrared spectrometer (FT-IR) (Spectrum 2000 (trade name) manufactured by PerkinElmer, Inc.). The surface of the transparent layer was evaluated by attenuated total reflection (ATR) spectroscopy using polarized light as the measurement light. The orientation function was calculated by the following procedure. The measurement was performed with polarized measurement beams at angles of 0° and 90° with respect to the stretch direction of the polarizer. The orientation function was calculated from the formula shown below using the intensity of the resulting spectrum at 2,941 $cm^{-1}$. The peak at 3,330 $cm^{-1}$ was used as a reference peak, and the intensity I used below was the value of (the peak intensity at 2,941 $cm^{-1}$)/(the peak intensity at 3,330 $cm^{-1}$). In this regard, when f=1, complete orientation is obtained, and when f=0, random orientation is obtained. The peak at 2,941 $cm^{-1}$ is said to be an absorption peak caused by —$CH_2$— vibration. If —$CH_2$— is absent in the main chain of the material used to form the transparent layer, another spectrum peak caused by the vibration of the main chain may be used instead for the evaluation.

$$f=(3<\cos^2\theta>-1)/2=(1-D)/[c(2D+1)], \text{ wherein} \quad \text{(Formula)}$$

$$c=(3\cos^2\beta-1)/2$$

If β=90 deg, then f=−2×(1−D)/(2D+1)
θ: molecular chain stretching direction
β: molecular chain transition dipole moment
D=$(I_\perp)/(I_{//})$ (the D value increases as PVA becomes oriented more)
$I_{195}$: the intensity measured when the polarized light is incident perpendicular to the stretch direction
$I_{//}$: the intensity measured when the polarized light is incident parallel to the stretch direction <Dimensional Change Rate>

A piece with a size of 100 mm long×100 mm wide was cut from each resulting pressure-sensitive-adhesive-layer-attached polarizing film, in which the longitudinal direction was the absorption axis direction of the polarizing film. The cut piece was bonded to a 1.3-mm-thick non-alkali glass sheet and then stored in an environment at 85° C. for 500 hours. Subsequently, the size of the cut piece of the polarizing film was measured. Using the obtained results, the rate (%) of dimensional change in the absorption axis direction was calculated from the following formula: {(the length after the storage)−(the length before the storage)}/(the length before the storage)×100(%).

The rate of dimensional change was evaluated as follows. The rate of reduction in dimensional change rate (the dimensional change-reducing effect) was calculated for the polarizing film using as a reference the rate of dimensional change of the corresponding polarizing film with a similar structure but without any transparent layer (Reference Examples 1 to 8), and then evaluated according to the criteria shown below. The dimensional change-reducing effect was calculated from the following formula: 100−{(the dimensional change rate)/(the reference dimensional change rate)×100}(%).

x: The dimensional change-reducing effect is less than 1.0% with respect to the reference.
Δ: The dimensional change-reducing effect is from 10% to less than 15% with respect to the reference.
◯: The dimensional change-reducing effect is from 15% to less than 20% with respect to the reference.
⊙: The dimensional change-reducing effect is 20% or more with respect to the reference.

<Crack Resistance>

A piece with a size of 400 mm wide×708 mm long (400 mm in the absorption axis direction) and a piece with a size of 708 mm long×400 mm wide (708 mm in the absorption axis direction) were cut from each resulting pressure-sensitive-adhesive-layer-attached polarizing film. The cut pieces were bonded in the directions of crossed Nicols to both sides of a non-alkali glass of 402 mm wide×710 mm long×1.3 mm thick to form a sample. The sample was stored in an over: at 95° C. for 250 hours. Subsequently, the sample was taken out and then visually observed for whether cracking occurred in the pressure-sensitive-adhesive-layer-attached polarizing film. This test was performed using 10 pieces for each sample. The number of cracked sample pieces was counted and evaluated according to the following criteria.

x: The number of cracked pieces is 6 or more.
Δ: The number of cracked pieces is from 3 to 5.
◯: The number of cracked pieces is from 1 to 2.
⊙: No crack occurs.

<Moist Heat Resistance (Rate of Change in Polarization Degree (Optical Reliability Test))>

A piece with a size of 25 mm×50 mm (50 mm in the absorption axis direction) was cut from each resulting pressure-sensitive-adhesive-layer-attached polarizing film. The cut piece (sample) of the one-side-protected polarizing film was stored in a thereto-hygrostat at 85° C. and 85% RH for 150 hours. The polarization degree of the one-side-protected polarizing film sample was measured before and after the storage using an integrating sphere-equipped spectral transmittance meter (DOT-3C manufactured by Murakami Color Research Laboratory Co., Ltd.), and used for the calculation of: rate (%) of change in polarization degree=(1−(the polarization degree after the storage)/(the polarization degree before the storage)).

The polarization degree P is calculated from the formula below using the transmittance (parallel transmittance Tp) of a laminate of the same two polarizing films with their transmission axes parallel to each other and the transmittance (crossed transmittance Tc) of a laminate of the same two polarizing films with their transmission axes orthogonal to each other. Polarization degree P (%)={(Tp−Tc)/(Tp+Tc)}$^{1/2}$×100

Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

Table 1 shows the rates of change in polarization degree and the results of evaluation of the rates of change based on the following criteria.

◯: The rate of change in polarization degree is 0.5% or less.
Δ: The rate of change in polarization degree is more than 0.5% to 5.0%.
x: The rate of change in polarization degree is more than 5.0%.

TABLE 1

| | | Polarizing film | | | | | | | | | | | | Evaluations | | | | | |
|---|---|---|---|---|---|---|---|---|---|---|---|---|---|---|---|---|---|---|---|
| | Features | | | Materials | | | | | | | | Compatible layer | | | Dimensional change | | Crack resistance | | Optical reliability (moisture resistance) | |
| | | Polarizer | | Transparent layer | | | | | | | | | | | | | | | | |
| | | thickness A (μm) | Boric acid content (%) | | Polyvinyl alcohol-based resin | | | | | Acryl-based resin | Thickness (μm) | Orientation index | Thickness B (μm) | Thickness C (μm) | B/A 100× C/A 100× | Dimensional change rate (%) | Dimensional change reducing effect (%) | Evaluation on dimensional change | Crack resistance (number of cracked pieces) | Evaluation of crack resistance | Polymerization degree change (%) | Evaluation of optical reliability |
| | Type | | | Type | Polyvinyl alcohol | | Polymerization degree | Additive | | | | | | | | | | | | | | |
| | | | | | Specification degree (mol %) | | | | | | | | | | | | | | | | | | |
| Example 1 | A0: one-side-protected | 5 | 16 | Layer-forming material A | 99.0 | | 2500 | — | — | 0.8 | 0.01 | 0.12 | — | 2.4 | −0.40 | 22 | ⊙ | 0 | ⊙ | 0.04 | ○ |
| Example 2 | A0: one-side-protected | 5 | 16 | Layer-forming material A | 99.0 | | 2500 | — | — | 3.1 | 0.01 | 0.30 | — | 6.0 | −0.35 | 31 | ⊙ | 0 | ⊙ | 1.50 | △ |
| Example 3 | A0: one-side-protected | 5 | 16 | Layer-forming material A | 99.0 | | 2500 | — | — | 1.8 | 0.01 | 0.25 | — | 5.0 | −0.38 | 25 | ⊙ | 0 | ⊙ | 0.43 | ○ |
| Example 4 | A0: one-side-protected | 5 | 16 | Layer-forming material D | 99.7 | | 2500 | — | — | 0.5 | 0.01 | 0.05 | — | 1.0 | −0.45 | 12 | △ | 1 | ○ | 0.06 | ○ |
| Example 5 | A0: one-side-protected | 5 | 16 | Layer-forming material E | 99.7 | | 2500 | WS | — | 1.2 | 0.01 | 0.22 | — | 4.4 | −0.29 | 43 | ⊙ | 0 | ⊙ | 0.23 | ○ |
| Example 6 | A1: one-side-protected | 5 | 14 | Layer-forming material E | 99.7 | | 2500 | WS | — | 1.2 | 0.01 | 0.30 | — | 6.0 | −0.20 | 56 | ⊙ | 0 | ⊙ | 0.39 | ○ |
| Example 7 | A2: one-side-protected | 5 | 20 | Layer-forming material E | 99.7 | | 2500 | WS | — | 1.2 | 0.01 | 0.20 | — | 4.0 | −0.45 | 36 | △ | 0 | ⊙ | 0.03 | ○ |
| Example 8 | A0: one-side-protected | 5 | 16 | Layer-forming material E | 99.7 | | 2500 | WS | — | 6.0 | 0.01 | 0.49 | — | 9.8 | −0.22 | 57 | ⊙ | 0 | ⊙ | 10.11 | X |
| Example 9 | A0: one-side-protected | 5 | 16 | Layer-forming material E | 95.0 | | 500 | — | — | 0.8 | 0.01 | 0.13 | — | 2.6 | −0.42 | 18 | ○ | 1 | ○ | 1.13 | △ |
| Example 10 | A0: one-side-protected | 5 | 16 | Layer-forming material B | 95.0 | | 500 | — | — | 5.0 | 0.01 | 0.34 | — | 6.8 | −0.35 | 31 | ⊙ | 0 | ⊙ | 3.50 | △ |
| Example 11 | D: one-side-protected | 7 | 16 | Layer-forming material A | 99.0 | | 2500 | — | — | 1.2 | 0.01 | 0.32 | — | 4.6 | −0.55 | 27 | ⊙ | 0 | ⊙ | 0.25 | ○ |
| Example 12 | E: one-side-protected | 12 | 16 | Layer-forming material A | 99.0 | | 2500 | — | — | 1.2 | 0.01 | 0.35 | — | 2.9 | −0.81 | 33 | ⊙ | 1 | ○ | 0.40 | ○ |
| Reference Example 1 | A0: one-side-protected | 5 | 16 | Absent | | | | | | | | — | — | — | −0.51 | — | Reference | 10 | X | 0.10 | ○ |
| Reference Example 2 | A1: one-side-protected | 5 | 14 | Absent | | | | | | | | — | — | — | −0.45 | — | Reference | 8 | X | 0.38 | ○ |

TABLE 1-continued

| | | Polarizing film | | | | | | | | | | | | Evaluations | | | | | |
|---|---|---|---|---|---|---|---|---|---|---|---|---|---|---|---|---|---|---|---|
| | Features | | | Transparent layer | | | | | | | Compatible layer | | | Dimensional change | | Crack resistance | | Optical reliability (moisture resistance) | |
| | | | | Materials | | | | | | | | | | | | | | | |
| | | Polarizer | Boric acid | Polyvinyl alcohol-based resin | | | | | | | Thick- | | | Dimen- | | | | | |
| | | thick- | con- | | Polyvinyl alcohol | | | Acryl- | Thick- | Orien- | ness: | | | sional | | Crack | Evalu- | | Evalu- |
| | | ness | tent | | Specifi- | Polymer- | | based | ness | tation | B (μm) | Thick- | | change | reducing | resistance | ation of | Polymer- | ation |
| | | A (μm) | (%) | Type | cation degree (mol %) | ization degree | Addi- tive | resin | (μm) | index | 100 × B/A | ness: C (μm) | 100 × C/A | rate (%) | effect (%) | (number of cracked pieces) | crack resis- tance | ization degree change (%) | of optical reliability |
| Reference Example 3 | A2: one-side- protected | 5 | 20 | | | Absent | | | | | | | | −0.70 | — | 10 | X | 0.01 | ○ |
| Reference Example 4 | D: one-side- protected | 7 | 16 | | | Absent | | | | | | | | −0.75 | — | 10 | X | 0.12 | ○ |
| Reference Example 5 | E: one-side- protected | 12 | 16 | | | Absent | | | | | | | | −1.20 | — | 10 | X | 0.33 | ○ |
| Reference Example 6 | F: one-side- protected | 23 | 16 | | | Absent | | | | | | | | −2.10 | — | 10 | X | 0.73 | △ |
| Comparative Example 1 | A0: one-side- protected | 5 | 16 | Layer-forming material A | 99.0 | 2500 | — | — | 1.0 | 0.01 | | 0.02 | 0.4 | −0.50 | 2 | 0 | ⊙ | 0.32 | ○ |
| Comparative Example 2 | A0: one-side- protected | 5 | 16 | — | — | — | — | Acryl A | 1.0 | 0.00 | | 0.00 | 0.0 | −0.50 | 2 | 2 | ○ | 1.55 | △ |
| Comparative Example 3 | A0: one-side- protected | 5 | 16 | Layer-forming material C | 86.0 | 500 | — | — | 0.1 | 0.00 | | 0.01 | 0.2 | −0.51 | 0 | 5 | △ | 2.70 | △ |
| Comparative Example 4 | F: one-side- protected | 23 | 16 | Layer-forming material B | 95.0 | 500 | — | — | 0.5 | 0.01 | | 0.05 | 0.2 | −2.05 | 2 | 8 | X | 0.88 | △ |
| Comparative Example 5 | F: one-side- protected | 23 | 16 | Layer-forming material B | 95.0 | 500 | — | — | 5.5 | 0.01 | | 0.50 | 2.2 | −2.00 | 5 | 5 | △ | 32.1 | X |

TABLE 1-continued

| | | Polarizing film | | | | | | | | | | | Evaluations | | | | | | |
|---|---|---|---|---|---|---|---|---|---|---|---|---|---|---|---|---|---|---|---|
| | | Features | | | Transparent layer | | | | | | Compatible layer | | | Dimensional change | | Crack resistance | | Optical reliability (moisture resistance) | |
| | | | | | Materials | | | | | | | | | | | | | | |
| | | | | | Polyvinyl alcohol-based resin | | | | | | | | | | | | | | |
| | | | | | Polyvinyl alcohol | | | | | | | | | | | | | | |
| | Type | Polarizer thickness A (μm) | Boric acid content (%) | Type | Specification degree (mol %) | Polymerization degree | Additive | Acryl-based resin | Thickness (μm) | Orientation index | Thickness B (μm) 100× B/A | Thickness C (μm) 100× C/A | Dimensional change rate (%) | Dimensional change reducing effect (%) | Evaluation on dimensional change | Crack resistance (number of cracked pieces) | Evaluation of crack resistance | Polymerization degree change (%) | Evaluation of optical reliability |
| Example 13 | B: one-side-protected (laminate) | 5 | 16 | Layer-forming material A | 99.0 | 2500 | — | — | 0.7 | 0.01 | 0.12 | 2.4 | −0.40 | 16 | ○ | 0 | ⊙ | 0.22 | ○ |
| Reference Example 7 | B: one-side-protected (laminate) | 5 | 16 | Absent | | | | | | | — | — | −0.48 | — | Reference | 3 | △ | 0.25 | ○ |
| Example 14 | C: double-side-protected | 5 | 16 | Layer-forming material A | 99.0 | 2500 | — | — | 0.7 | 0.01 | 0.12 | 2.4 | −0.49 | 18 | ○ | 0 | ⊙ | 1.15 | △ |
| Reference Example 8 | C: double-side-protected | 5 | 16 | Absent | | | | | | | — | — | −0.60 | — | Reference | 0 | ⊙ | 1.59 | △ |

In Table 1, WS represents methylolmelamine (WATERSOL S-695 manufactured by DIC Corporation).

DESCRIPTION OF REFERENCE SIGNS

1 Polarizer
2 Transparent layer
3 Resin substrate
4 Protective film
10 Polarizing film
11 Polarizing film
X Compatible layer
A Polarizer thickness
B Compatible layer thickness

The invention claimed is:

1. A polarizing film comprising:
a polarizer comprising a polyvinyl alcohol-based resin and having a thickness of 15 μm or less;
a transparent layer provided on at least one surface of the polarizer and having a material capable of penetrating the polarizer; and
a compatible layer that is compatible with the transparent layer and provided in a transparent layer-side portion of the polarizer, wherein
the polarizer and the compatible layer have a thickness A and a thickness B, respectively, satisfying the general formula: (100×B/A)≥1,
wherein the compatible layer is a portion of the polarizer having the material of the transparent layer penetrated therein.

2. The polarizing film according to claim 1, wherein the compatible layer has a boric acid concentration lower than that of a portion of the polarizer other than the compatible layer.

3. The polarizing film according claim 1, wherein the transparent layer has a thickness of 0.2 μm or more.

4. The polarizing film according to claim 1, wherein the transparent layer has a thickness of 6 μm or less.

5. The polarizing film according to claim 1, wherein the transparent layer has an orientation index of 0.05 or less.

6. The polarizing film according to claim 1, wherein the transparent layer is a product made from a layer-forming material comprising a polyvinyl alcohol-based resin.

7. The polarizing film according to claim 6, wherein the polyvinyl alcohol-based resin has a saponification degree of 99% by mole or more and an average degree of polymerization of 2,000 or more.

8. The polarizing film according to claim 1, wherein the polarizer is designed to have a single-body transmittance T and a polarization degree P representing optical properties satisfying the condition of the following formula: $P > -(10^{0.0929T-42.4}-1) \times 100$ (provided that T<42.3) or P≥99.9 (provided that T≥42.3).

9. The polarizing film according to claim 8, further comprising a protective film.

10. A pressure-sensitive-adhesive-layer-attached polarizing film comprising: the polarizing film according to claim 1; and a pressure-sensitive adhesive layer.

11. An image display device comprising the pressure-sensitive-adhesive-layer-attached polarizing film according to claim 10.

12. An image display device comprising the polarizing film according to claim 1.

13. A polarizing film comprising:
a polarizer comprising a polyvinyl alcohol-based resin and having a thickness of 15 μm or less;
a transparent layer provided on at least one surface of the polarizer; and
a low-boric-acid-concentration layer that is provided in a transparent layer-side portion of the polarizer and has a boric acid concentration lower than that of any other portion of the polarizer, wherein
the polarizer and the low-boric-acid-concentration layer have a thickness A and a thickness C, respectively, satisfying the general formula: (100×C/A)≥1,
wherein the low-boric-acid-concentration layer is a portion of the polarizer.

14. The polarizing film according to claim 13, wherein the transparent layer has a thickness of 0.2 μm or more.

15. The polarizing film according to claim 13, wherein the transparent layer has a thickness of 6 μm or less.

16. The polarizing film according to claim 13, wherein the transparent layer has an orientation index of 0.05 or less.

17. The polarizing film according to claim 13, wherein the transparent layer is a product made from a layer-forming material comprising a polyvinyl alcohol-based resin.

18. The polarizing film according to claim 13, wherein the polarizer is designed to have a single-body transmittance T and a polarization degree P representing optical properties satisfying the condition of the following formula: $P > -(10^{0.0929T-42.4}-1) \times 100$ (provided that T<42.3) or P≥99.9 (provided that T≥42.3).

19. The polarizing film according to claim 13, further comprising a protective film.

20. A pressure-sensitive-adhesive-layer-attached polarizing film comprising: the polarizing film according to claim 13; and a pressure-sensitive adhesive layer.

21. An image display device comprising the pressure-sensitive-adhesive-layer-attached polarizing film according to claim 20.

22. An image display device comprising the polarizing film according to claim 13.

23. The polarizing film according to claim 13, wherein a material of the transparent layer is capable of penetrating the polarizer.

* * * * *